(12) United States Patent
Xiao et al.

(10) Patent No.: US 10,494,996 B2
(45) Date of Patent: Dec. 3, 2019

(54) DEVICE OF HIGH-TEMPERATURE SOLAR TURBINE POWER GENERATION WITH THERMAL ENERGY STORAGE

(71) Applicant: Zhejiang University, Hangzhou (CN)

(72) Inventors: Gang Xiao, Hangzhou (CN); Xin Zhou, Hangzhou (CN); Huanlei Liu, Hangzhou (CN); Jinli Chen, Hangzhou (CN); Tianfeng Yang, Hangzhou (CN); Mingjiang Ni, Hangzhou (CN); Zhongyang Luo, Hangzhou (CN); Leming Cheng, Hangzhou (CN); Xiang Gao, Hangzhou (CN); Kefa Cen, Hangzhou (CN); Mengxiang Fang, Hangzhou (CN); Jinsong Zhou, Hangzhou (CN); Zhenglun Shi, Hangzhou (CN); Qinhui Wang, Hangzhou (CN); Shurong Wang, Hangzhou (CN); Chunjiang Yu, Hangzhou (CN); Tao Wang, Hangzhou (CN); Chenghang Zheng, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 322 days.

(21) Appl. No.: 15/587,524

(22) Filed: May 5, 2017

(65) Prior Publication Data
US 2018/0045113 A1 Feb. 15, 2018

(30) Foreign Application Priority Data

Aug. 12, 2016 (CN) .......................... 2016 1 0668545
Nov. 30, 2016 (CN) .......................... 2016 1 1090624

(51) Int. Cl.
*F02C 1/05* (2006.01)
*F02C 6/14* (2006.01)
(Continued)

(52) U.S. Cl.
CPC ................. *F02C 1/05* (2013.01); *F02C 6/14* (2013.01); *F02C 7/042* (2013.01); *F03G 6/045* (2013.01);
(Continued)

(58) Field of Classification Search
CPC ...... F02C 1/05; F02C 6/14; F03G 6/00; F03G 6/045; Y02E 10/465
See application file for complete search history.

(56) References Cited

U.S. PATENT DOCUMENTS 2,968,916 A * 1/1961 Fayette .................... F03G 6/00
126/27
4,222,369 A * 9/1980 Jubb ........................ F02C 1/05
126/643
(Continued)

*Primary Examiner* — Steven M Sutherland
(74) *Attorney, Agent, or Firm* — David D. Brush; Westman, Champlin & Koehler, P.A.

(57) ABSTRACT

A device of high-temperature solar gas turbine power generation with thermal energy storage includes a combustion chamber, a solar receiver, a thermochemical energy storage tank, a triple valve A and a triple valve B. The thermochemical energy storage tank has a high-temperature side and a low-temperature side. One outlet of the triple valve A is connected to the compressed air inlet of the solar receiver, and the other outlet is connected to the inlet of the triple valve B. One outlet of the triple valve B is connected to the low-temperature side of the thermochemical energy storage tank, and the other outlet is connected to the inlet of the combustion chamber.

11 Claims, 7 Drawing Sheets

(51) Int. Cl.
*F03G 6/04* (2006.01)
*F02C 7/042* (2006.01)
(52) U.S. Cl.
CPC ......... *F05D 2220/70* (2013.01); *Y02E 10/465* (2013.01)

(56) References Cited

U.S. PATENT DOCUMENTS

| | | | | | |
|---|---|---|---|---|---|
| 4,727,930 | A | * | 3/1988 | Bruckner | F02C 1/05 165/111 |
| 5,267,288 | A | * | 11/1993 | Frutschi | F02C 1/05 376/391 |
| 5,444,972 | A | * | 8/1995 | Moore | F02C 1/05 60/39.182 |
| 6,279,312 | B1 | * | 8/2001 | Hennecke | F01D 15/10 60/39.3 |
| 2003/0097843 | A1 | * | 5/2003 | Sugarmen | C01B 3/34 60/780 |
| 2011/0233940 | A1 | * | 9/2011 | Aoyama | F01K 23/10 290/1 R |
| 2015/0033760 | A1 | * | 2/2015 | Koyama | F02C 1/05 60/801 |
| 2015/0226119 | A1 | * | 8/2015 | Tanimura | F02C 3/22 60/39.12 |

* cited by examiner

DEVICE OF HIGH-TEMPERATURE SOLAR TURBINE POWER GENERATION WITH THERMAL ENERGY STORAGE

The application claims the priority of Chinese Patent Application No. 201610668545.9, filed on Aug. 12, 2016, entitled "a method and device of high-temperature solar gas turbine power generation with thermal energy storage", and Chinese Patent Application No. 201611090624.2, filed Nov. 30, 2016, which are incorporated by reference herein in their entireties.

TECHNICAL FIELD

The present invention relates to energy technologies, particularly a device of high-temperature solar gas turbine power generation with thermal energy storage.

BACKGROUND ART

The global total solar radiation energy is about $1.7 \times 10^{17}$ W and China shared 1% of the total solar radiation energy (about $1.8 \times 10^{15}$ W, equivalent to 1,900,000 million tons of standard coal per year), which is equal to 700 times of annual total energy consumption in China. Therefore, solar energy has great potential as a new energy source. Besides, solar energy is clean, pollution-free and renewable, whose utilization can significantly alleviate the pressure of current fossil energy crisis and environment pollution.

The solar power generation technology is usually classified into photovoltaic power generation and solar thermal power generation. Photovoltaic power generation has large impact on the power grid because of low flux density and serious fluctuation of solar energy. Moreover, battery is the best choice as energy storage media for photovoltaic power generation but not feasible because of relatively high cost.

The solar thermal power generation technologies use the thermal energy from concentrating solar radiation to generate power. Recently, solar gas turbine is a promising option in solar thermal power generation systems. The gas turbine power generation system provides high efficiency, fast start, good peak-load regulation performance, short construction period, small occupied area, low water consumption, low maintenance cost etc. Solar energy is used to heat air from the compressor, and the heated compressed air enters turbine directly or after being heated further in the combustion chamber for power generation to generate power. Therefore, the fossil fuel consumption can be greatly reduced.

However, just as mentioned above, because of the low flux density and large fluctuation of solar energy, the temperature of solar receiver can be excessively high when solar radiation is strong thus decreasing the operation stability; when solar radiation is insufficient, the temperature of compressed air entering the combustion chamber may be inadequate, so the effectiveness of energy saving in solar power generation is reduced.

SUMMARY OF THE INVENTION

The present invention aims to provide a device of high-temperature solar gas turbine power generation with thermal energy storage, which can reduce fossil fuel consumption and provide longer service life and better quality for power grid.

To solve the above technical problems, the present invention proposes a device of high-temperature solar gas turbine power generation with thermal energy storage, including a combustion chamber, a solar receiver, a thermochemical energy storage tank, a triple valve A, and a triple valve B;

The thermochemical energy storage tank has a high-temperature side and a low-temperature side;

One outlet of the triple valve A is connected to the compressed air inlet of the solar receiver and the other outlet is connected to the inlet of the triple valve B; one outlet of the triple valve B is connected to the low-temperature side of the thermochemical energy storage tank, and the other outlet is connected to the inlet of the combustion chamber;

The compressed air outlet of the solar receiver is connected to the high-temperature side of the thermochemical energy storage tank and the inlet of the combustion chamber, and the low-temperature side of the thermochemical energy storage tank is also connected to the inlet of the combustion chamber;

When the solar energy is sufficient, air enters the solar receiver through the triple valve A to be heated to higher temperature. Then part of the air from the solar receiver enters the thermochemical energy storage tank, flows through each layer of the thermochemical energy storage materials from the high-temperature side to the low-temperature side, and mixes with the other part of air. Later, the mixed air enters the combustion chamber to assist combustion.

When the solar energy is insufficient, air enters the thermochemical energy storage tank through the triple valve A and the triple valve B, flows through each layer of thermochemical energy storage materials from the low-temperature side to the high-temperature side, being heated by the heat released from the thermochemical energy storage tank, and then enters the combustion chamber to assist combustion.

At present, several types of heat storage methods have been widely used. According to the forms of energy storage, heat storage methods can be divided into the following categories: sensible heat storage, latent heat storage, and thermochemical energy storage.

The sensible heat storage method stores or releases heat through the temperature change of thermal storage materials. This method is the simplest one with the most mature technology and widest application, but its heat storage density is relatively low, that is, the storage volume is relatively large.

The latent heat storage method stores or releases the latent heat when the heat storage media undergoes melting/solidification, gasification/condensation, sublimation/desublimation or other process. This method has several advantages, such as high heat storage density and small temperature fluctuation during the storing and releasing processes, but the phase-change materials are generally not used as the heat transfer fluid at the same time. Thus, an independent heat exchanger is required in the system, and the corrosive effect of phase-change materials should be considered.

The thermochemical energy storage method stores or releases the heat through a reversible chemical reaction. When the temperature is higher than the equilibrium temperature of the reversible reaction, endothermic reaction occurs; when the temperature is lower than the equilibrium temperature, exothermic reaction occurs. Among these three heat storage methods, the thermochemical energy storage method has the highest heat storage density.

Compared with the prior art, the device of high-temperature solar gas turbine power generation with thermal energy storage stores the solar energy in a thermochemical energy storage tank by using thermochemical energy storage method, which has higher storage density and reduces the influence of solar energy fluctuation on the system. Therefore, this method can enhance the stability of electric power generation, prolong time of electric power generation and improve the electric quality for the power grid. The fuel, solar energy and thermochemical energy storage are complementary in the present invention, which realizes cascade utilization of energy, improves the total efficiency of the system, reduces consumption of fossil fuel and reaches better economic benefit. Coupling the solar receiver with the thermochemical energy storage tank can stabilize the outlet temperature of solar receiver and prevent over-temperature of the solar receiver, which ensures the safe and stable operation and prolongs the service life of the solar receiver.

The solar receiver is a key component of the solar thermal power generation system, which converts the concentrating solar energy to thermal energy. Because of the harsh working conditions of high temperature, high pressure and non-uniform high-intensity solar radiation, the solar receiver can be easily damaged or even has safety accidents if not correctly designed or controlled. Therefore, operating the solar receiver stably and safely is very important. Air receiver tubes are arranged in the solar receiver and the thermochemical energy storage materials are filled around the air receiver tubes. When the inner temperature of the solar receiver is higher than the reaction equilibrium temperature of the thermochemical energy storage materials, excess thermal energy is absorbed and converted to chemical energy by the endothermic reaction of the thermochemical energy storage materials; when the inner temperature of the solar receiver is lower than the reaction equilibrium temperature of thermochemical energy storage materials, the stored chemical energy is released by the exothermic reaction of the thermochemical energy storage materials with the air in the air receiver tubes heated to a higher temperature. This design can make up for the lack of solar energy and stabilize the temperature of the solar receiver. Therefore, the service life of the solar receiver can be further prolonged with the thermochemical energy storage materials filled around the air receiver tubes.

The bottom part of the air receiver tubes is also filled with the thermochemical energy storage materials.

The air receiver tubes are spirally distributed in the solar receiver.

Alternatively, the air receiver tubes are radially distributed from the center of the solar receiver.

Alternately, the air receiver tubes are distributed along the circumferential direction of the solar receiver.

The spirally distributed air receiver tubes can increase heat transfer area and improve heat transfer efficiency, and the air receiver tubes radially distributed from the center of the solar receiver can facilitate heat transfer process and optimize the design of auxiliary equipment, thus reducing cost. The air receiver tubes distributed along the circumferential direction of the solar receiver can maximize the space utilization in the solar receiver and increase the density of the air receiver tubes.

The device of high-temperature solar gas turbine power generation with thermal energy storage further includes a turbine and a recuperator which has a hot fluid side and a cold fluid side.

The outlet of the combustion chamber is connected to the inlet of the turbine and the outlet of the turbine is connected to the hot fluid side inlet of the recuperator.

The cold fluid side outlet of recuperator is connected to the inlet of the triple valve A.

Exhaust gas from the turbine enters the hot fluid side to heat the air at the cold fluid side.

With the recuperator, when exhaust gas from the turbine flows through the hot fluid side of the recuperator, the air flowing through the cold fluid side is heated by the exhaust gas, so that the heat of exhaust gas can be used more effectively. Therefore, the overall energy consumption of the device of high-temperature solar gas turbine power generation with thermal energy storage is further reduced, and the energy utilization efficiency is improved.

The device of high-temperature solar gas turbine power generation with thermal energy storage includes a waste heat utilization device, which is connected to the hot fluid side outlet of the recuperator.

Exhaust gas from the turbine enters the waste heat utilization device with the waste heat of exhaust gas further recycled after the exhaust gas flows through the hot fluid side of the recuperator.

With the recuperator and the waste heat utilization device, cascade utilization of the waste heat is achieved and the energy utilization efficiency is improved.

Device of high-temperature solar gas turbine power generation with thermal energy storage further includes a blower pipe and an induced draft fan; the solar receiver is open.

One end of the blower pipe is connected to the solar receiver and the other end is connected to the inlet of the waste heat utilization device. The induced draft fan is arranged at the outlet of the waste heat utilization device. When the induced draft fan works, air is induced into the solar receiver from the environment and then enters the waste heat utilization device through the blower pipe.

Air circulation can enhance the reaction process and the heat absorption process of air receiver tubes in the solar receiver. The exhausted heat can be transferred to the waste heat utilization device, and thereby improving the energy utilization efficiency.

Moreover, when the solar receiver is filled with the thermochemical energy storage materials, the rate of endothermic and exothermic reactions is well controlled by adjusting the circulating air amount with the induced draft fan, and therefore heat storage and release effect is better.

Moreover, device of high-temperature solar gas turbine power generation with thermal energy storage further includes a compressor and a generator; the outlet of the compressor is connected to the cold fluid side inlet of the recuperator to transport compressed air into the cold fluid side; the generator is connected to the compressor and the compressor is connected to the turbine.

As a power consumption component, the compressor can compress the ambient air and then transport the compressed air. When the turbine is connected to the compressor by a single shaft, part of power produced by the turbine is consumed by the compressor and therefore the system does not need additional power for the compressor. Moreover, it is not reliable to directly connect the generator with the turbine because of the high temperature of exhaust gas discharged from the turbine. Therefore, the generator is directly connected to the compressor by the shaft, which can better prolong service life of the generator.

Moreover, device of high-temperature solar gas turbine power generation with thermal energy storage includes a throttle valve.

The solar receiver is connected to the inlet of the combustion chamber through the throttle valve. The airflow from the solar receiver into the combustion chamber can be controlled by the throttle valve.

By adjusting the opening of the throttle valve, flow rate of the air through the throttle valve and the thermochemical energy storage tank is controlled, so that the temperature of air supplied for the combustion chamber can be stabilized under different solar radiation conditions.

Moreover, at least two kinds of thermochemical energy storage materials are arranged in the thermochemical energy storage tank and the reaction equilibrium temperature of the thermochemical energy storage materials successively decreases from the high-temperature side to the low-temperature side of the thermochemical energy storage tank. The arrangement of thermochemical energy storage materials forms a sequential temperature gradient in the thermochemical energy storage tank. Heat exchange between the air and the thermochemical energy storage materials takes place sequentially when the air flows sequentially through the materials in the thermochemical energy storage tank, so that the temperature variation range of air is extended compared with single thermochemical energy storage material and the effect of thermal energy storage is improved.

Moreover, the thermochemical energy storage materials form several thermochemical energy storage layers from the high-temperature side to the low-temperature side. There are intervals between these layers. The intervals weaken the interference and heat exchange between different layers and thus maintain the temperature gradient better.

It is noted that, in the present invention, the thermochemical energy storage materials can be one kind or several kinds of carbonates, alkali, metal oxides, etc. The metal oxides can be one kind or several kinds of oxides of Cr, Li, Mg, Pb, Pt, Sb, Mn, U, Ba, Co, Rh, Cu, Fe, and V. Taking the carbonates for instance, when the temperature is higher than the equilibrium temperature of their decomposition and synthesis reactions, carbonates decompose and absorb heat; when the temperature is lower than the equilibrium temperature of their decomposition and synthesis reactions, carbonates are synthesized and release heat. Taking metal oxides for instance, when the temperature is higher than the equilibrium temperature of their redox reactions, reduction reactions take place with heat absorbed and oxygen released; when the temperature is lower than the equilibrium temperature of their redox reactions, oxidation reactions take place with heat released and oxygen absorbed.

DESCRIPTION OF EMBODIMENTS

First Embodiment

Figure 1:
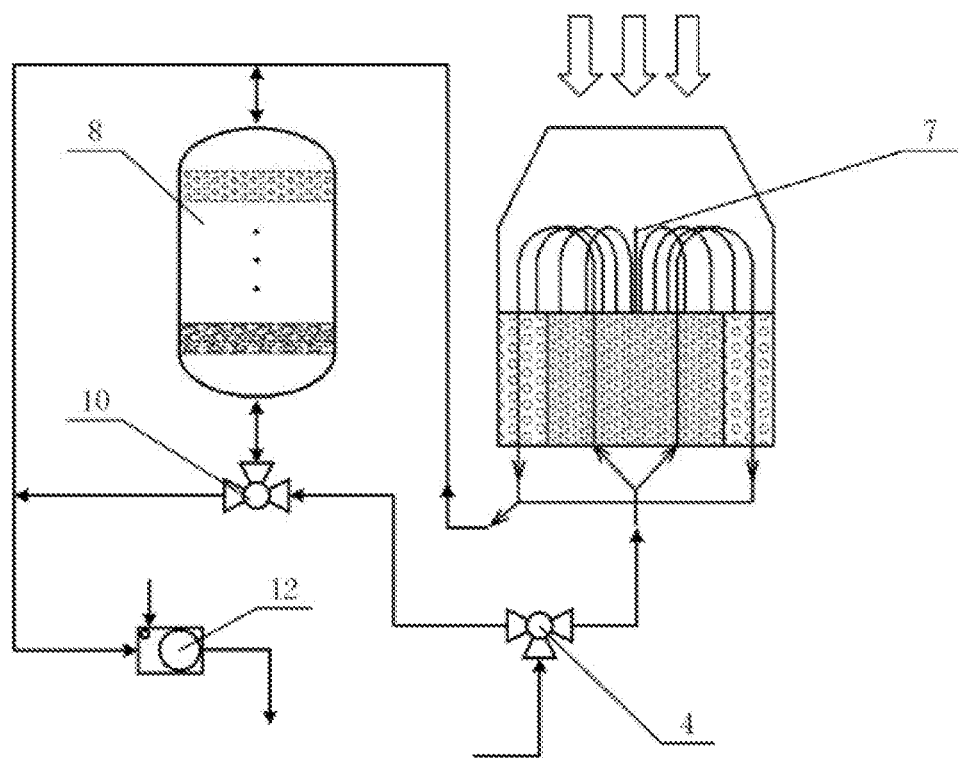
FIG. 1 is a schematic view of a device of high-temperature solar gas turbine power generation with thermal energy storage of the first embodiment of the present invention.
Figure 2:
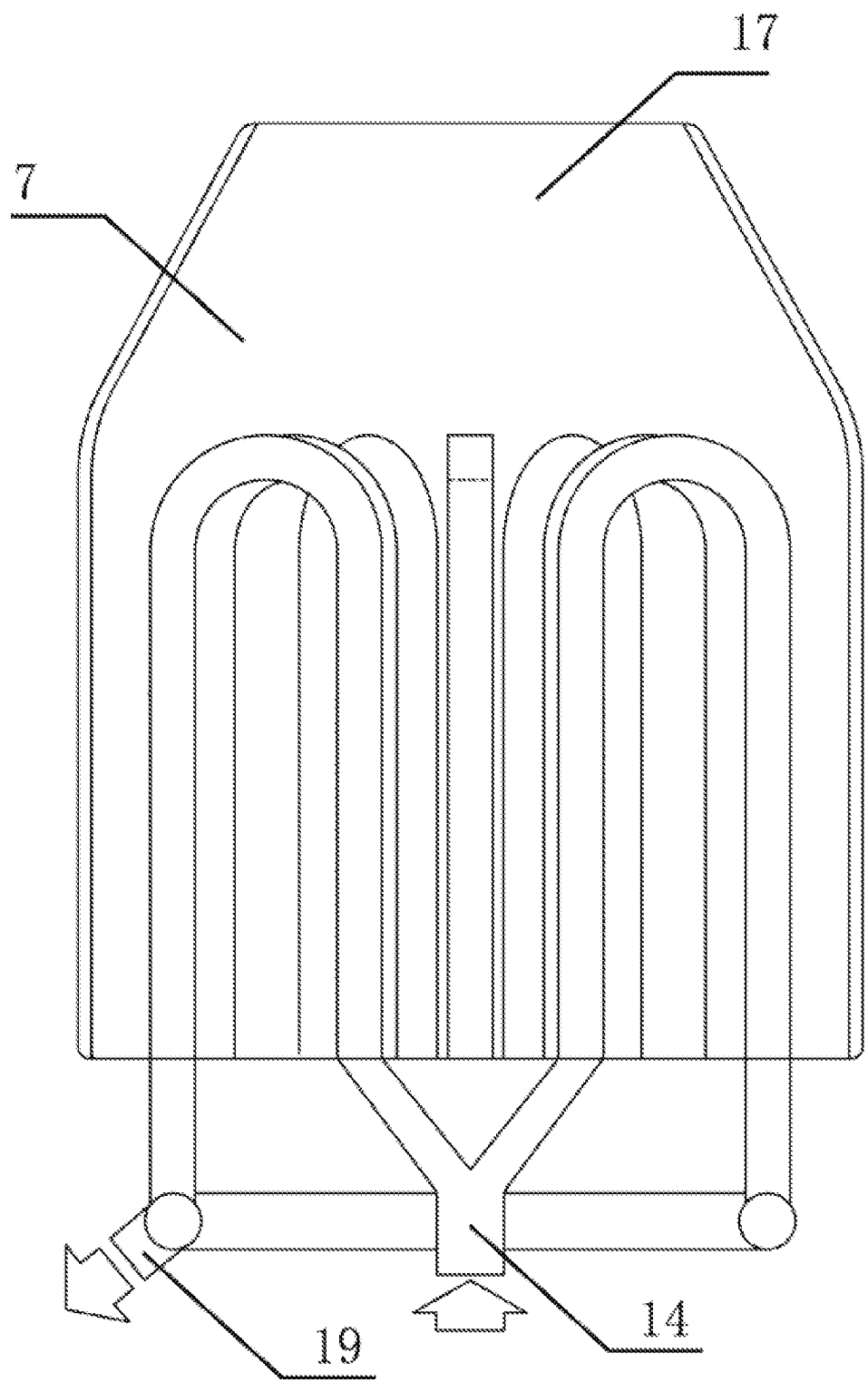
FIG. 2 is a schematic view of a solar receiver of the first embodiment of the present invention.

The first embodiment of the present invention provides a device of high-temperature solar gas turbine power generation with thermal energy storage, as shown in FIGS. 1 and 2, including a combustion chamber 12, a solar receiver 7, a thermochemical energy storage tank 8, a triple valve A4, and a triple valve B10.

The thermochemical energy storage tank 8 has a high-temperature side and a low-temperature side.

One outlet of the triple valve A4 is connected to the compressed air inlet 14 of the solar receiver and the other outlet is connected to the inlet of the triple valve B10, one outlet of the triple valve B10 is connected to the low-temperature side of the thermochemical energy storage tank 8, and the other outlet is connected to the inlet of the combustion chamber 12.

The compressed air outlet 19 of the solar receiver is connected to the high-temperature side of the thermochemical energy storage tank 8 and the inlet of the combustion chamber 12, and the low-temperature side of the thermochemical energy storage tank 8 is also connected to the inlet of the combustion chamber 12.

When the solar energy is sufficient, air enters the solar receiver 7 through the triple valve A4 to be heated to a higher temperature. Then part of the air from the solar receiver 7 enters the thermochemical energy storage tank 8, flows through each layer of the thermochemical energy storage materials from the high-temperature side to the low-temperature side, and mixes with the other part of the air. Later, the mixed air enters the combustion chamber 12 to assist combustion.

When the solar energy is insufficient, air enters the thermochemical energy storage tank 8 through the triple valve A4 and the triple valve B10, flows through each layer of the thermochemical energy storage materials from the low-temperature side to the high-temperature side, being heated by the heat released from the thermochemical energy storage tank 8, and then enters the combustion chamber 12 to assist combustion.

Those of ordinary skill in the art can utilize the high-temperature gas from the combustion chamber 12 for multiple purposes according to the prior art. For example, the high-temperature gas can enter a turbine to do work and then drive a generator connected with the turbine to generate power. Since the detail of gas utilization method and power generation method are the prior art, it is not shown in FIG. 1.

At present, several types of heat storage methods have been widely used. According to the forms of energy storage, heat storage methods can be divided into the following categories: sensible heat storage, latent heat storage, and thermochemical energy storage.

The sensible heat storage method stores or releases heat through the temperature change of thermal storage materials. This method is the simplest one with the most mature technology and widest application, but its heat storage density is relatively low, that is the storage volume is relatively large.

The latent heat storage method stores or releases the latent heat when the heat storage media undergoes melting/solidification, gasification/condensation, sublimation/desublimation or other process. This method has several advantages, such as high heat storage density and small temperature fluctuation during the storing and releasing process, but the phase-change materials are generally not used as the heat transfer fluid at the same time. Thus, an independent heat exchanger is required in the system, and the corrosive effect of phase-change materials should be considered.

The thermochemical energy storage method stores or releases the heat through a reversible chemical reaction. When the temperature is higher than the equilibrium temperature of the reversible reaction, endothermic reaction occurs; when the temperature is lower than the equilibrium temperature, exothermic reaction occurs. Among these three heat storage methods, the thermochemical energy storage method has the highest heat storage density.

It is noted that, in this embodiment, the thermochemical energy storage materials can be one kind or several kinds of carbonates, alkali, metal oxides, etc. The metal oxides can be one kind or several kinds of oxides of Cr, Li, Mg, Pb, Pt, Sb, Mn, U, Ba, Co, Rh, Cu, Fe, and V. Taking carbonates for instance, when the temperature is higher than the equilibrium temperature of their decomposition and synthesis reactions, the carbonates decompose and absorb heat; when the temperature is lower than the equilibrium temperature of their decomposition and synthesis reactions, the carbonates are synthesized and release heat. Taking metal oxides for instance, when the temperature is higher than the equilibrium temperature of their redox reactions, reduction reactions take place, with heat absorbed and oxygen released; when the temperature is lower than the equilibrium temperature of their redox reactions, oxidation reactions take place with heat released and oxygen absorbed.

Compared with the prior art, the device of high-temperature solar gas turbine power generation with thermal energy storage of the present invention stores the solar energy in the thermochemical energy storage tank 8 by using thermochemical energy storage method, which has higher storage density as mentioned above and can reduce the influence of solar energy fluctuation on the system. Therefore, this method can enhance the stability of electric power generation, prolong time for electric power generation and improve the electric quality for the power grid. The fuel, solar energy and thermochemical energy storage are complementary in the present invention, which realizes cascade utilization of energy, improves the total efficiency of the system, reduces consumption of fossil fuel and reaches better economic benefit. Coupling the solar receiver 7 with the thermochemical energy storage tank 8 can stabilize the outlet temperature of solar receiver 7 and prevent over-temperature of the solar receiver 7, which ensures the safe and stable operation and prolongs the service life of the solar receiver 7.

Second Embodiment

Figure 3:
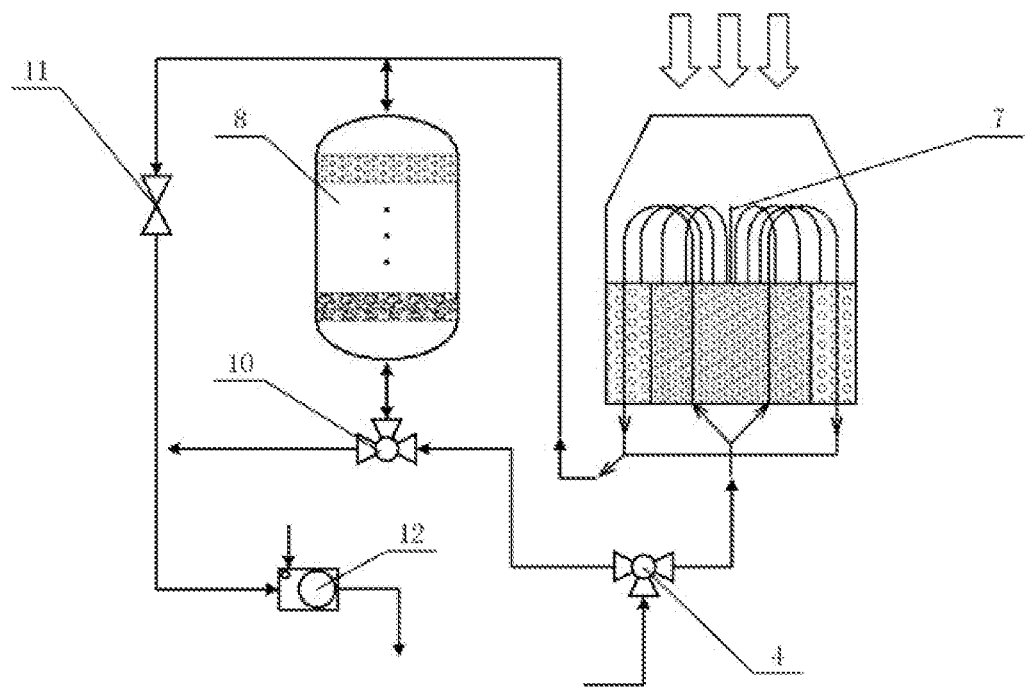
FIG. 3 is a schematic view of a device of high-temperature solar gas turbine power generation with thermal energy storage according to a second embodiment of the present invention.

The second embodiment of the present invention provides a device of high-temperature solar gas turbine power generation with thermal energy storage, which is the further improvement of the first embodiment. Main improvement in the second embodiment, as shown in FIG. 3, is that the device of high-temperature solar gas turbine power generation with thermal energy storage further includes a throttle valve 11.

The solar receiver 7 is connected to the inlet of the combustion chamber 12 through the throttle valve 11. The airflow from the solar receiver 7 into the combustion chamber 12 can be controlled by the throttle valve 11.

By adjusting the opening of the throttle valve 11, flow rate of the air through the throttle valve 11 and the thermochemical energy storage tank 8 is controlled, so that the temperature of air supplied for the combustion chamber 12 can be stabilized under different solar radiation conditions.

Third Embodiment

Figure 4:
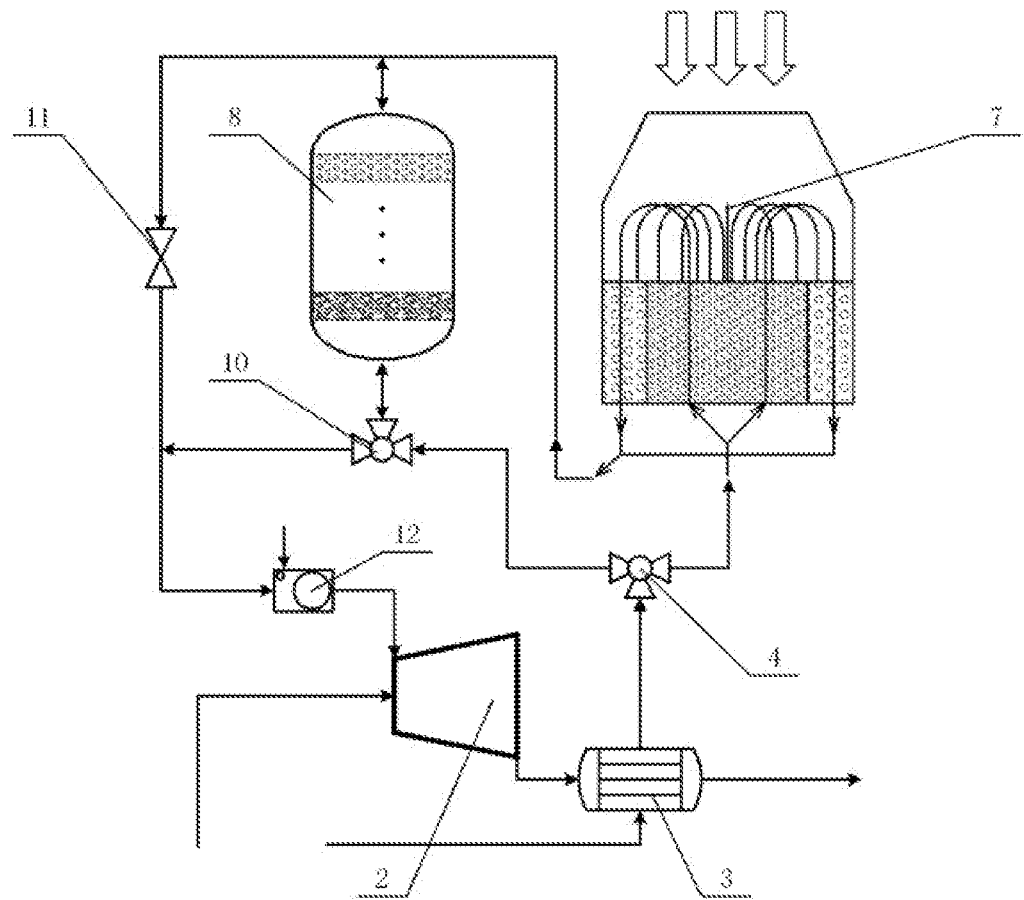
FIG. 4 is a schematic view of a device of high-temperature solar gas turbine power generation with thermal energy storage according to a third embodiment of the present invention.

The third embodiment of the present invention provides a device of high-temperature solar gas turbine power generation with thermal energy storage, which is the further improvement of the first and second embodiments. Main improvement in the third embodiment, as shown in FIG. 4, is that the device of high-temperature solar gas turbine power generation with thermal energy storage further includes a turbine 2 and a recuperator 3 which has a hot fluid side and a cold fluid side.

The outlet of the combustion chamber 12 is connected to the inlet of the turbine 2 and the outlet of the turbine 2 is connected to the hot fluid side inlet of the recuperator 3.

The cold fluid side outlet is connected to the inlet of the triple valve A4.

Exhaust gas from the turbine 2 enters the hot fluid side to heat the air at the cold fluid side.

With the recuperator 3, when exhaust gas from the turbine 2 flows through the hot fluid side of the recuperator 3, the air flowing through the cold fluid side is heated by the heat of the exhaust gas, so that the heat of the exhaust gas can be used more effectively. Therefore, the overall energy consumption of the device of high-temperature solar gas turbine power generation with thermal energy storage is further reduced, and the energy utilization efficiency is improved.

Fourth Embodiment

Figure 5:
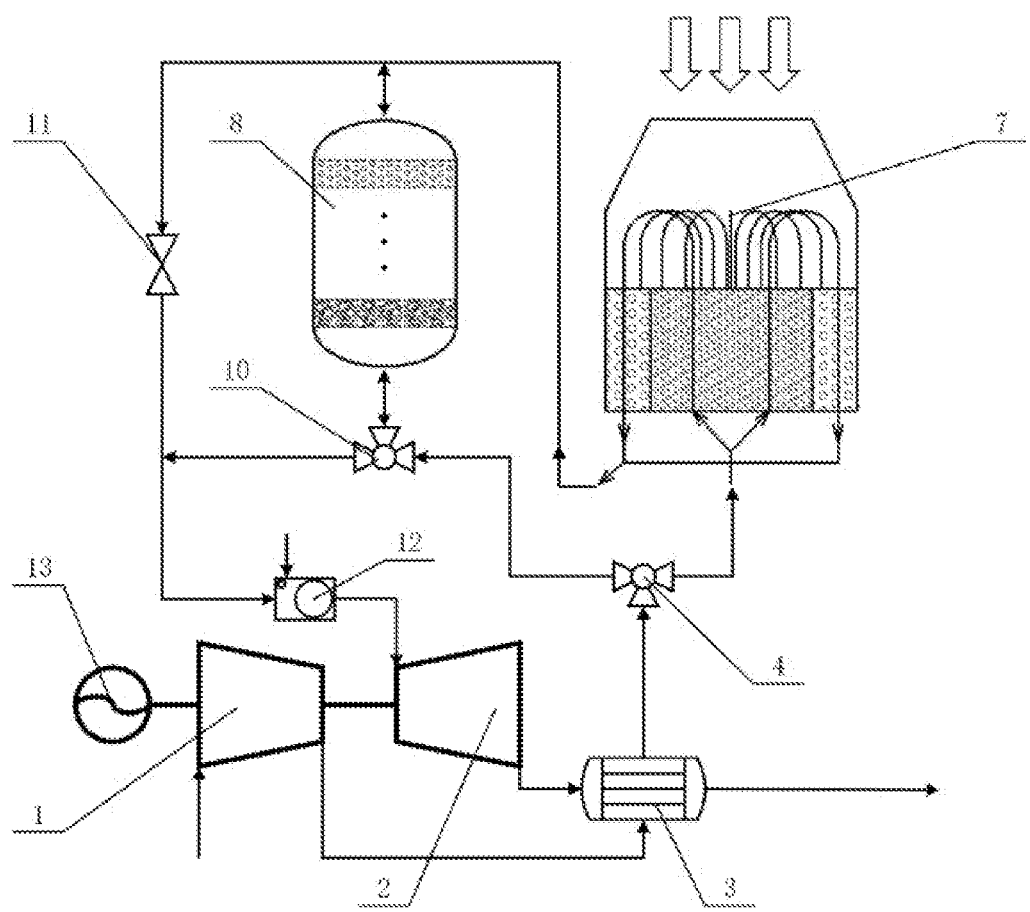
FIG. 5 is a schematic view of a device of high-temperature solar gas turbine power generation with thermal energy storage according to a fourth embodiment of the present invention.

The fourth embodiment of the present invention provides a device of high-temperature solar gas turbine power generation with thermal energy storage, which is the further improvement of the third embodiment. Main improvement in the fourth embodiment, as shown in FIG. 5, is that the device of high-temperature solar gas turbine power generation with thermal energy storage further includes a compressor 1 and a generator 13; the outlet of the compressor 1 is connected to the cold fluid side inlet to transport compressed air into the cold fluid side; the generator 13 is connected to the compressor 1 and the compressor 1 is connected to the turbine 2.

As a power consumption component, the compressor 1 can compress the atmospheric air and then transport the compressed air. When the turbine 2 is connected to the compressor 1 by a single shaft, part of power produced by the turbine 2 is consumed by the compressor 1 and therefore the system does not need to provide additional power for the compressor 1. Moreover, it is not reliable to directly connect the generator 13 with the turbine 2 because of the high temperature of exhaust gas directly discharged from the turbine 2. Therefore, the generator 13 is directly connected to the compressor 1 by the shaft, which can better prolong service life of the generator 13.

Fifth Embodiment

Figure 6:
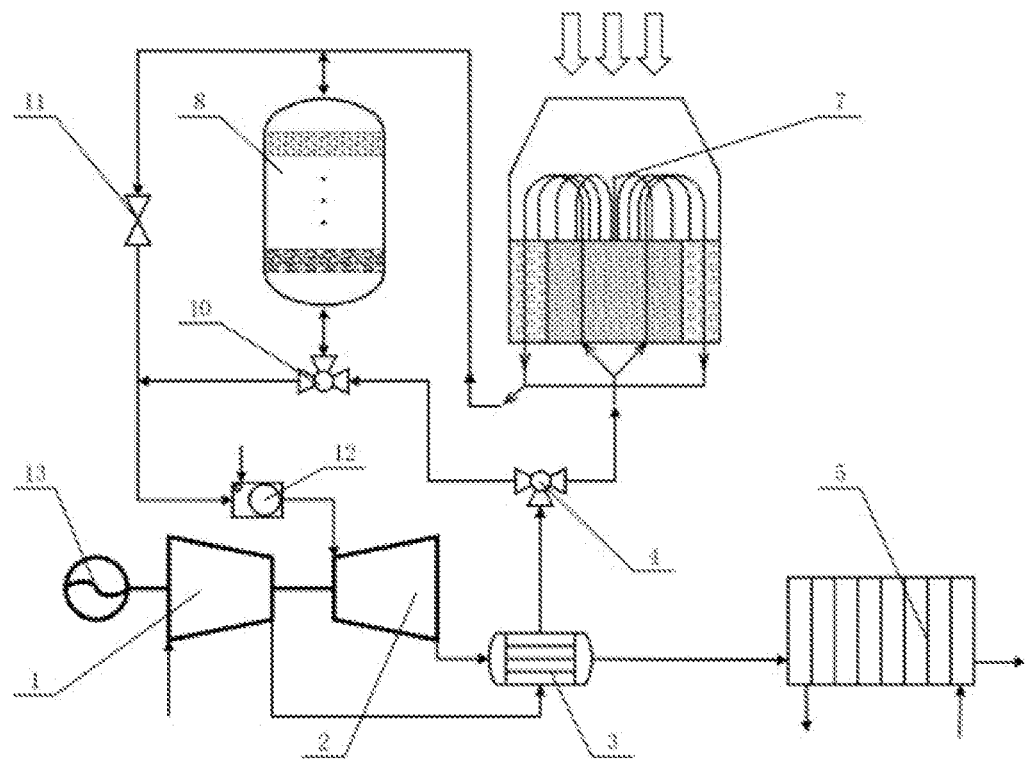
FIG. 6 is a schematic view of a device of high-temperature solar gas turbine power generation with thermal energy storage according to a fifth embodiment of the present invention.

The fifth embodiment of the present invention provides a device of high-temperature solar gas turbine power generation with thermal energy storage, which is the further improvement of the third and fourth embodiments. Main improvement in the fifth embodiment, as shown in FIG. 6, is that the device of high-temperature solar gas turbine power generation with thermal energy storage further includes a waste heat utilization device 5.

The waste heat utilization device 5 is connected to the hot fluid side outlet of the recuperator 3.

Exhaust gas from the turbine 2 enters the waste heat utilization device 5 with the waste heat of exhaust gas further recycled after the exhaust gas flows through the hot fluid side of the recuperator 3.

With the recuperator 3 and the waste heat utilization device 5, cascade utilization of the waste heat is achieved and the energy utilization efficiency is improved.

Sixth Embodiment

Figure 7:
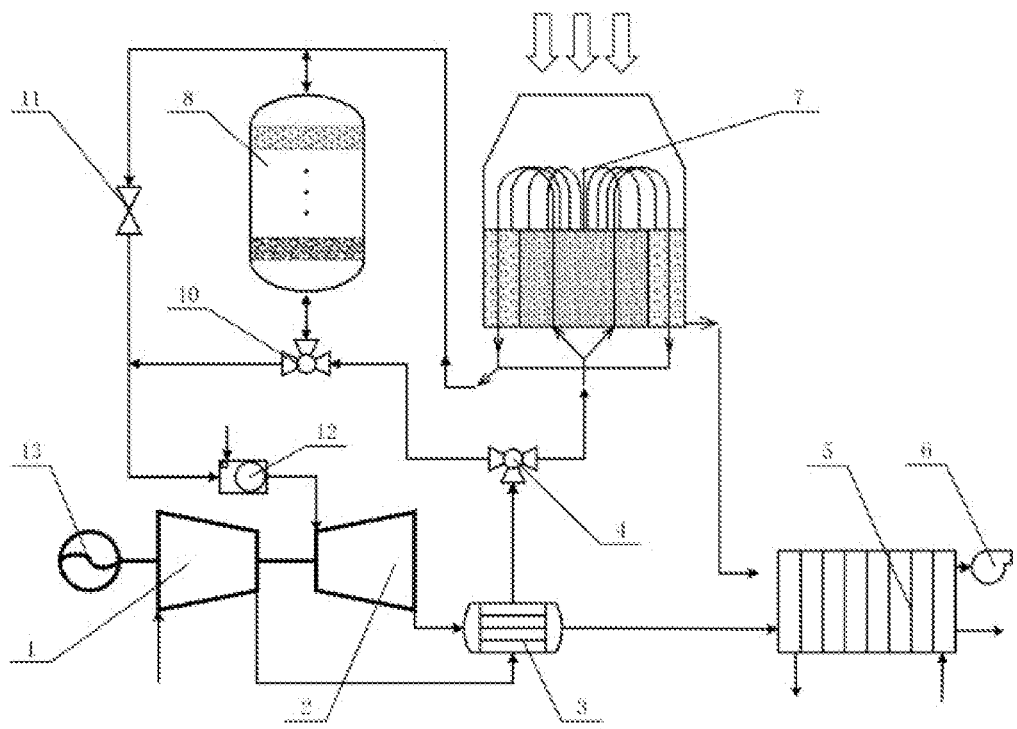
FIG. 7 is a schematic view of a device of high-temperature solar gas turbine power generation with thermal energy storage according to a sixth embodiment of the present invention.

The sixth embodiment of the present invention provides a device of high-temperature solar gas turbine power generation with thermal energy storage, which is the further improvement of the fifth embodiment. Main improvement in the sixth embodiment, as shown in FIG. 7, is that the device of high-temperature solar gas turbine power generation with thermal energy storage further includes a blower pipe and an induced draft fan 6; the solar receiver 7 is open.

One end of the blower pipe is connected to the solar receiver 7 and the other end is connected to the inlet of the waste heat utilization device 5. The induced draft fan 6 is arranged at the outlet of the waste heat utilization device 5. When the induced draft fan 6 works, air is induced into the solar receiver 7 from the environment and then enters the waste heat utilization device 5 through the blower pipe.

Air circulation can enhance the reaction process and the heat absorption process of air receiver tubes in the solar receiver 7. The excess released heat can be transferred to the waste heat utilization device 5, and thereby improving the energy utilization efficiency.

Seventh Embodiment

Figure 8:
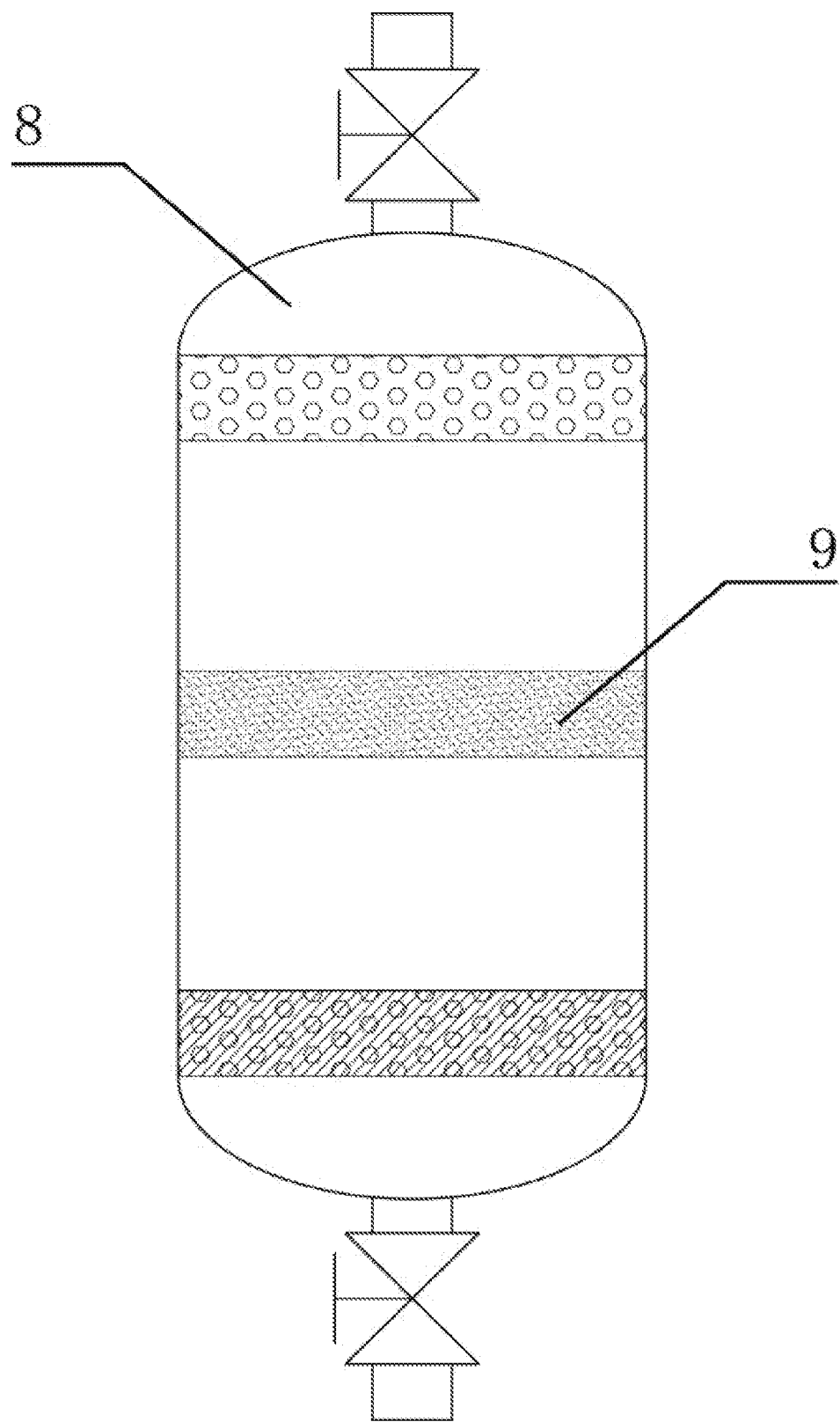
FIG. 8 is a schematic view of a thermochemical energy storage tank according to a seventh embodiment of the present invention.

The seventh embodiment of the present invention provides a device of high-temperature solar gas turbine power generation with thermal energy storage, which is the further improvement of the first to sixth embodiments. Main improvement in the seventh embodiment, as shown in FIG. 8, is that at least two kinds of thermochemical energy storage materials are arranged in the thermochemical energy storage tank 8 and the reaction equilibrium temperature of the thermochemical energy storage materials successively decreases from the high-temperature side to the low-temperature side of the thermochemical energy storage tank 8. The arrangement of thermochemical energy storage materials forms a sequential temperature gradient in the thermochemical energy storage tank 8. Heat exchange between the air and the thermochemical energy storage materials takes place sequentially when the air flows sequentially through the materials in the thermochemical energy storage tank 8, so that the temperature variation range of air is extended compared with single thermochemical energy storage material and the effect of thermal energy storage is improved.

Further, as shown in FIG. 7, in this embodiment, the thermochemical energy storage materials form several thermochemical energy storage layers 9 from the high-temperature side to the low-temperature side. There are intervals between these layers. The intervals weaken the interference and heat exchange between different layers and thus maintain the temperature gradient better.

Eighth Embodiment

The eighth embodiment of the present invention provides a device of high-temperature solar gas turbine power generation with thermal energy storage, which is the further improvement of the first to seventh embodiments. Main improvement in the eighth embodiment is that the solar receiver 7 is provided with air receiver tubes 16.

The solar receiver 7 is a key component of the solar thermal power generation system, which can convert the concentrating solar energy to thermal energy. Because of the serious working conditions of high temperature, high pressure and non-uniform high-intensity solar radiation, the solar receiver 7 can be easily damaged or even has safety accidents if not correctly designed or controlled. Therefore, operating the solar receiver 7 stably and safely is very important.

Figure 9:
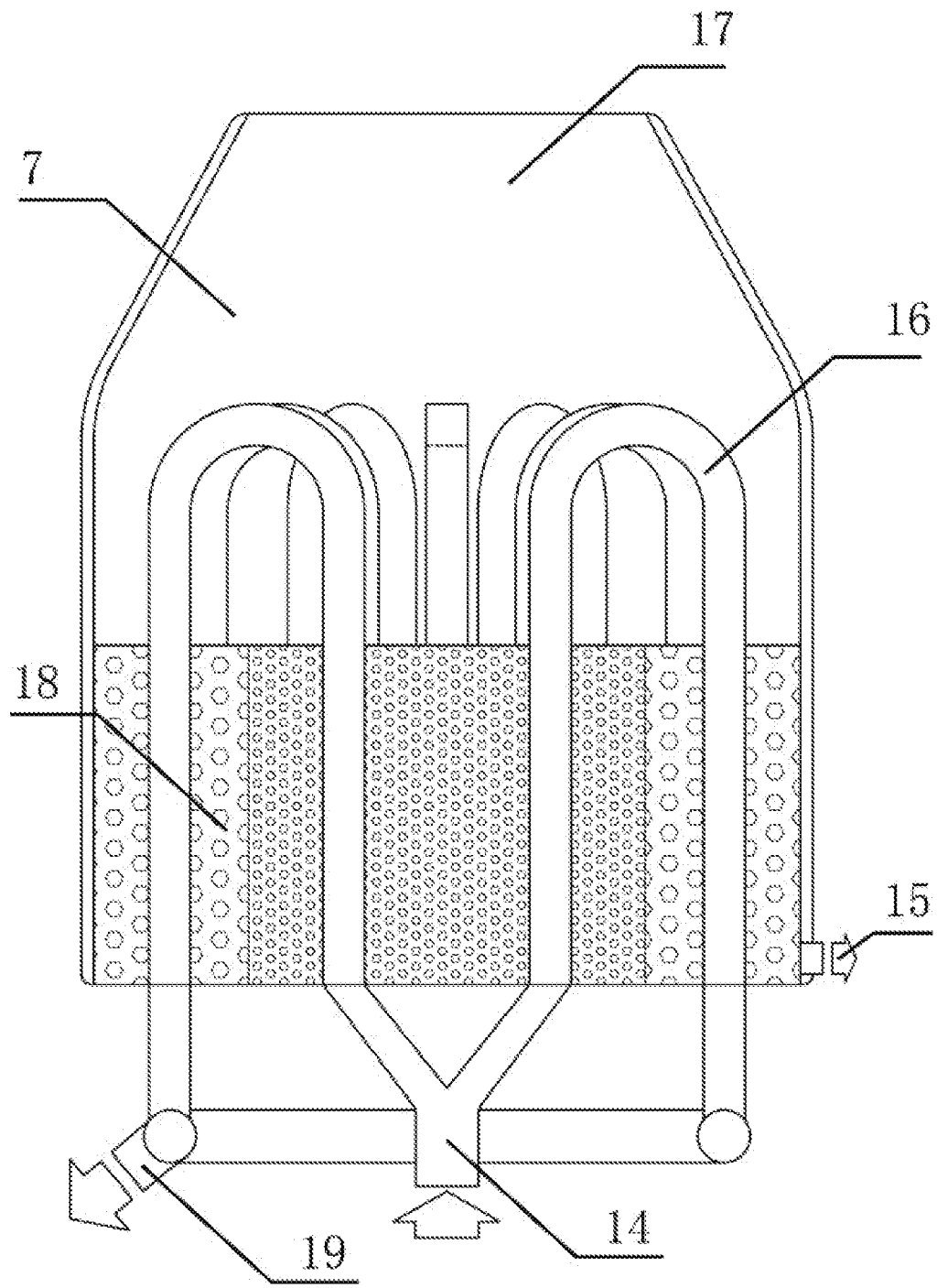
FIG. 9 is a schematic view of a solar receiver according to an eighth embodiment of the present invention.

As shown in FIG. 9, in this embodiment, the air receiver tubes 16 are arranged in the solar receiver 7. The air receiver tubes 16 are U-shaped and distributed along the circumferential direction of the solar receiver 7. The distribution of the air receiver tubes 16 can maximize the space utilization in the solar receiver 7 and increase the distribution density of the air receiver tubes 16. It is noted that, in this embodiment, the air receiver tubes 16 can also be spirally distributed in the solar receiver 7 or radially distributed from the center of the solar receiver 7. The spiral distribution of the air receiver tubes 16 can increase heat transfer area and improve heat transfer efficiency. The radial distribution of the air receiver tubes 16 can facilitate heat transfer process and optimize the design of auxiliary equipment, thus reducing cost.

More importantly, in this embodiment, the thermochemical energy storage materials 18 are filled around the air receiver tubes 16 and the bottom part of air receiver tubes 16 is also filled with the thermochemical energy storage materials 18. When the inner temperature of the solar receiver 7 is higher than the reaction equilibrium temperature of the thermochemical energy storage materials 18, excess thermal energy is absorbed and converted to chemical energy by the endothermic reaction of the thermochemical energy storage materials 18; when the inner temperature of the solar receiver 7 is lower than the reaction equilibrium temperature of thermochemical energy storage materials 18, the stored chemical energy is released by the exothermic reaction of the thermochemical energy storage materials 18 with the air in the air receiver tubes 16 heated to a higher temperature, which can make up for the lack of solar energy and stabilize the temperature of the solar receiver 7. Therefore, the service life of the solar receiver 7 can be further prolonged with the thermochemical energy storage materials 18 filled around the air receiver tubes 16.

It is noted that, in this embodiment, the thermochemical energy storage materials 18 in the solar receiver 7 and the thermochemical energy storage tank 8 can be same or different. Those of ordinary skill in the art can choose different kinds of thermochemical energy storage materials for each part according to practical temperature.

Moreover, as shown in FIG. 9, when the induced draft fan 6 and the blower pipe are installed as described in the sixth embodiment, a blower pipe connection port 15 is arranged at the bottom of the solar receiver 7. The rate of endothermic and exothermic reactions of the thermochemical energy storage materials 18 in the solar receiver 7 can be well controlled by adjusting the circulating air amount in the solar receiver 7 with the induced draft fan 6. Therefore, heat storage and release effect is better.

Those of ordinary skill in the art can understand that many technical details are proposed to provide readers with a better understanding of the above embodiments. However, even if there are no technical details and variations and modifications based on the above embodiments, the technical schemes required by the claims of the present application may be substantially realized. Therefore, in practice, various modifications may be made in form and detail to the above embodiments without departing from the spirit and scope of the present invention.

REFERENCE NUMERALS 1 compressor
2 turbine
3 recuperator
4 triple valve A
5 waste heat utilization device
6 induced draft fan
7 solar receiver
8 thermochemical energy storage tank
9 thermochemical energy storage layer
10 triple valve B
11 throttle valve
12 combustion chamber
13 generator
14 compressed air inlet of solar receiver
15 blower pipe connection port
16 solar receiver tube
17 solar opening
18 thermochemical energy storage material
19 compressed air outlet of solar receiver

We claim:

1. A device of high-temperature solar gas turbine power generation with thermal energy storage, comprising:
    a combustion chamber, a solar receiver, a thermochemical energy storage tank, a triple valve A, and a triple valve B, wherein,
    the thermochemical energy storage tank has a high-temperature side and a low-temperature side;
    one outlet of the triple valve A is connected to a compressed air inlet of the solar receiver and another outlet is connected to an inlet of the triple valve B; one outlet of the triple valve B is connected to the low-temperature side of the thermochemical energy storage tank, and another outlet is connected to an inlet of the combustion chamber;
    a compressed air outlet of the solar receiver is connected to the high-temperature side of the thermochemical energy storage tank and the inlet of the combustion chamber; the low-temperature side of the thermochemical energy storage tank is also connected to the inlet of the combustion chamber;
    the device comprises a first flow path along which air enters the solar receiver through the triple valve A to be heated to higher temperature, after which one part of the air from the solar receiver enters the thermochemical energy storage tank, flows through each layer of thermochemical energy storage materials from the high-temperature side to the low-temperature side, mixes with the other part of the air and then enters the combustion chamber to assist combustion; and
    the device comprises a second flow path along which air enters the thermochemical energy storage tank through the triple valve A and the triple valve B, flows through each layer of thermochemical energy storage materials from the low-temperature side to the high-temperature side, being heated by heat released from the thermochemical energy storage tank, and then enters the combustion chamber to assist combustion.

2. The device of high-temperature solar gas turbine power generation with thermal energy storage according to claim 1, wherein,
    air receiver tubes are arranged in the solar receiver and the thermochemical energy storage materials are filled around the air receiver tubes.

3. The device of high-temperature solar gas turbine power generation with thermal energy storage according to claim 2, wherein, a bottom part of the air receiver tubes is filled with the thermochemical energy storage materials; and
    the air receiver tubes are spirally distributed in the solar receiver, or the air receiver tubes are radially distributed from a center of the solar receiver, or the air receiver tubes are distributed along a circumferential direction of the solar receiver.

4. The device of high-temperature solar gas turbine power generation with thermal energy storage according to claim 1, further comprising a turbine and a recuperator, wherein,
    the recuperator has a hot fluid side and a cold fluid side;
    an outlet of the combustion chamber is connected to an inlet of the turbine and an outlet of the turbine is connected to the hot fluid side inlet of the recuperator;
    the cold fluid side outlet of the recuperator is connected to the inlet of the triple valve A; and
    exhaust gas from the turbine enters the hot fluid side of the recuperator to heat the air flowing through the cold fluid side of the recuperator.

5. The device of high-temperature solar gas turbine power generation with thermal energy storage according to claim 4, further comprising a waste heat utilization device, wherein,
    the waste heat utilization device is connected to the hot fluid side outlet of the recuperator; and
    exhaust gas from the turbine enters the waste heat utilization device with waste heat of exhaust gas further recycled after exhaust gas flows through the hot fluid side of the recuperator.

6. The device of high-temperature solar gas turbine power generation with thermal energy storage according to claim 5, further comprising a blower pipe and an induced draft fan, wherein,
    the solar receiver is open; and
    one end of the blower pipe is connected to the solar receiver and the other end is connected to an inlet of the waste heat utilization device; the induced draft fan is arranged at an outlet of the waste heat utilization device.

7. The device of high-temperature solar gas turbine power generation with thermal energy storage according to claim 4, further comprising a compressor and generator, wherein,
    an outlet of the compressor is connected to the cold fluid side inlet of the recuperator and compressed air is transported into the cold fluid side of the recuperator; and
    the generator is connected to the compressor and the compressor is connected to the turbine.

8. The device of high-temperature solar gas turbine power generation with thermal energy storage according to claim 1, further comprising a throttle valve, wherein, the solar receiver is connected to the inlet of the combustion chamber through the throttle valve.

9. The device of high-temperature solar gas turbine power generation with thermal energy storage according to claim 1, wherein, at least two kinds of thermochemical energy storage materials are arranged in the thermochemical energy storage tank and a reaction equilibrium temperature of the thermochemical energy storage materials successively decreases from the high-temperature side to the low-temperature side of the thermochemical energy storage tank.

10. The device of high-temperature solar gas turbine power generation with thermal energy storage according to claim 9, wherein, the thermochemical energy storage materials form several thermochemical energy storage layers from the high-temperature side to the low-temperature side and there are intervals between the thermochemical energy storage layers.

11. A device of high-temperature solar gas turbine power generation with thermal energy storage, comprising:

a combustion chamber, a solar receiver, a thermochemical energy storage tank, a triple valve A, and a triple valve B, wherein, the thermochemical energy storage tank has a high-temperature side and a low-temperature side;

one outlet of the triple valve A is connected to a compressed air inlet of the solar receiver and another outlet is connected to an inlet of the triple valve B; one outlet of the triple valve B is connected to the low-temperature side of the thermochemical energy storage tank, and another outlet is connected to an inlet of the combustion chamber;

a compressed air outlet of the solar receiver is connected to the high-temperature side of the thermochemical energy storage tank and the inlet of the combustion chamber; the low-temperature side of the thermochemical energy storage tank is also connected to the inlet of the combustion chamber.

\* \* \* \* \*